(12) United States Patent
Palazzolo et al.

(10) Patent No.: US 6,484,572 B1
(45) Date of Patent: Nov. 26, 2002

(54) METHOD AND APPARATUS FOR VEHICLE ENGINE DIAGNOSTICS

(75) Inventors: John Palazzolo, St. Clair Township, MI (US); William E. Sammons, Ortonville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/615,934

(22) Filed: Jul. 13, 2000

(51) Int. Cl.[7] .............................................. G01M 15/00
(52) U.S. Cl. ...................................................... 73/118.1
(58) Field of Search ............................... 73/116, 117.2, 73/118.1, 119 R

(56) References Cited

U.S. PATENT DOCUMENTS

| | | | |
|---|---|---|---|
| 2,003,949 A | * | 6/1935 | Morgan et al. |
| 4,574,620 A | | 3/1986 | Cohl |
| 5,105,653 A | | 4/1992 | Konter |
| 5,517,852 A | | 5/1996 | Woodason et al. |
| 5,750,888 A | | 5/1998 | Matsumoto et al. |
| 5,898,103 A | * | 4/1999 | Denz et al. ................. 73/118.1 |
| 5,936,153 A | | 8/1999 | Steckler et al. |
| 6,085,587 A | * | 7/2000 | Konzelmann ............... 73/118.2 |

* cited by examiner

*Primary Examiner*—Eric S. McCall
(74) *Attorney, Agent, or Firm*—Ralph E. Smith

(57) ABSTRACT

An engine diagnostic tool for simulating turbocharger operation within an engine of a motor vehicle, while the engine is not running, includes a turbocharger with an air inlet, an inner surface and an outer surface. The diagnostic tool includes a plug adapted to sealingly engage the inlet of the turbo. The plug includes an aperture for supplying pressurized air to the inlet. The diagnostic tool also includes a clamp adapted to selectively restrict movement of the plug relative to the inlet. The clamp is adapted to be removably coupled to the inlet.

17 Claims, 3 Drawing Sheets

METHOD AND APPARATUS FOR VEHICLE ENGINE DIAGNOSTICS

BACKGROUND OF THE INVENTION

1. Technical Field

The present invention generally relates to an apparatus and method to perform vehicle engine diagnostic tests. More particularly, the present invention pertains to an arrangement to simulate turbocharger operation without running the vehicle engine.

2. Discussion

Vehicles having engines equipped with turbochargers have presented a challenge to service technicians and other repair personnel attempting to diagnose the cause of a customer complaint. The diagnosis is challenging due to the method in which the turbocharger functions. As is commonly known, a turbocharger is an air pump used to increase the volume of air entering into the combustion chamber of the engine. The increased air volume thereby increases the power output of the engine. The turbocharger is driven by a turbine located in the exhaust gas path. Accordingly, as engine speed increases, exhaust gas volume increases to turn the turbine at an increased rate. Subsequently, intake air pressure, or boost, also increases. Using this mechanism, the turbocharger supplies a charge of air to the engine at a pressure greater than atmospheric pressure. Therefore, to properly diagnose turbocharger operation, air pressures greater than atmospheric must be generated. Unfortunately, the higher pressures have typically been generated by running the engine at a relatively high speed while attempting to diagnose the problem.

Performing engine diagnostics while the engine is operating at a very high speed it is undesirable for a variety of reasons. When an engine is operating near maximum RPM, its power output is also near its maximum. If the energy is inadvertently released, the likelihood of damage to engine components and service personnel working nearby is high. Additionally, the difficulty of diagnosing a leak within the intake air system greatly increases because of the noise generated from the engine operating at a high speed.

SUMMARY OF THE INVENTION

Accordingly, it is an object of the present invention to provide a method and apparatus for engine diagnostics by generating the boost pressure created by a turbocharger without requiring the engine to be running.

It is another object of the present invention to provide a portable, cost effective tool for variably pressurizing the charge air cooling system of an engine equipped with a turbocharger.

It is yet another object of the present invention to provide a method and apparatus for quickly and accurately determining the cause of a customer complaint associated with the turbocharger system.

The present invention pertains to an engine diagnostic tool for simulating turbocharger operation within an engine of a motor vehicle while the engine is not running. The turbocharger includes an air inlet having an inner surface and an outer surface. The diagnostic tool includes a plug adapted to sealingly engage the inlet of the turbo. The plug includes an aperture for supplying pressurized air to the inlet. The diagnostic tool also includes a clamp adapted to selectively restrict movement of the plug relative to the inlet. The clamp is adapted to be removably coupled to the inlet.

DETAILED DESCRIPTION OF THE PREFERRED EMBODIMENT

Figure 1:
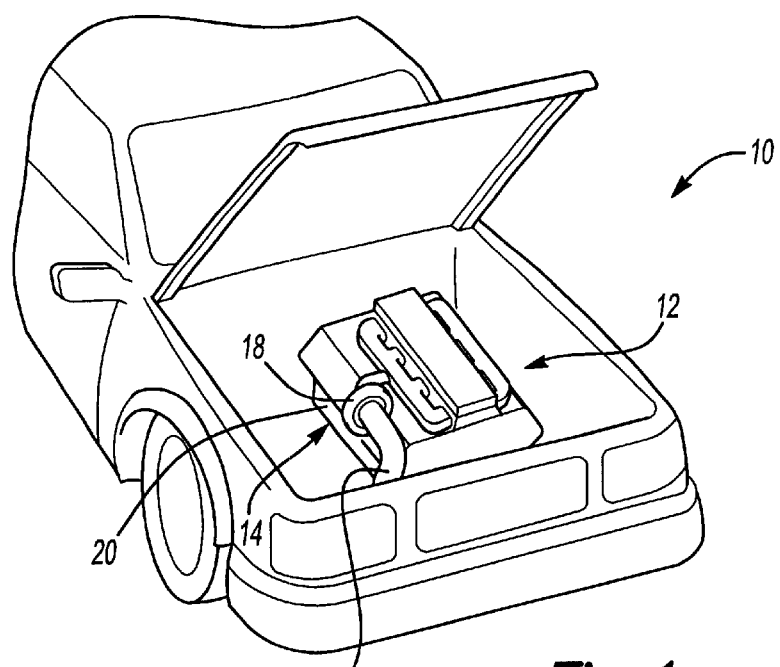
FIG. 1 is a perspective view of an exemplary motor vehicle including an engine equipped with a turbocharger.

With initial reference to FIG. 1, an exemplary vehicle 10 includes an engine 12 to supply power to the vehicle during operation. Engine 12 is equipped with an intake air system 14 including an intake duct 16 and a turbocharger 18. As discussed above, turbocharger 18 is operatively coupled to an exhaust system 20.

Figure 2:
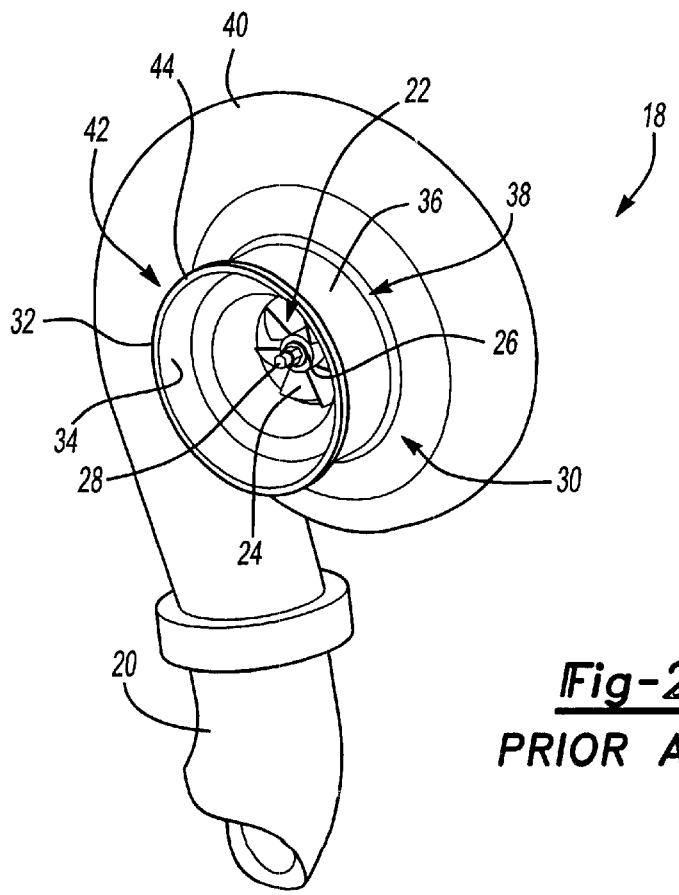
FIG. 2 is a fragmented perspective view of the turbocharger with the intake air duct removed.

As most clearly shown in FIG. 2, turbocharger 18 includes an impeller 22 having a plurality of vanes 24 radially extending from a hub 26. Hub 26 is rotatably mounted to a shaft 28 such that impeller 22 rotates once the turbine (not shown) is contacted by exhaust gasses emitted from engine 12. Accordingly, intake air is drawn from outside of vehicle 12 into duct 16 (FIG. 1) and turbocharger 18. The air is pressurized by impeller 22 to provide air at a pressure greater than atmospheric pressure to the cylinders of engine 12.

Turbocharger 18 also includes a generally circular cylindrical hollow inlet 30 having a sidewall 32 with an inner surface 34 and an outer surface 36. Inlet 30 includes a proximal end 38 mounted to a housing 40 and a distal end 42. A flange 44 radially extends from distal end 42. Turbocharger 18 further includes a wastegate (not shown) to divert exhaust gases into the atmosphere to prevent over-boost. Typically, the wastegate is set to open at 27–29 PSI.

Figure 3:
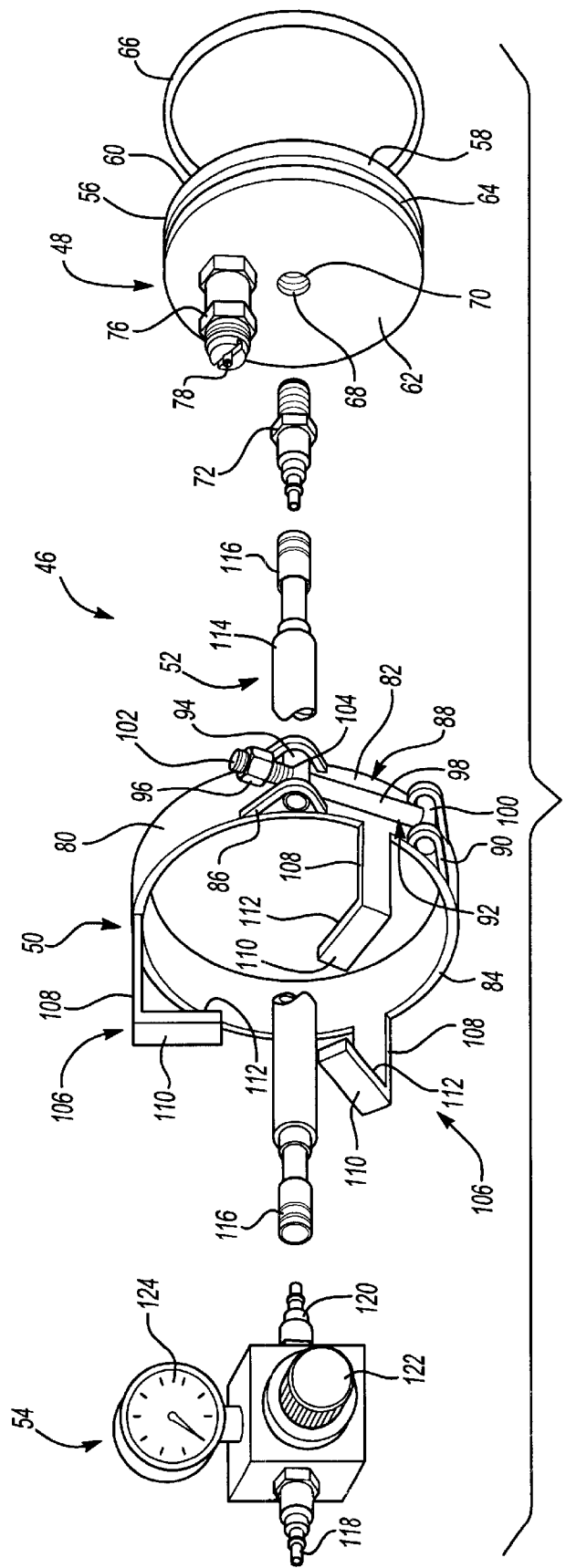
FIG. 3 is an exploded perspective view of an engine diagnostic tool constructed in accordance with the teachings of the present invention.

With reference to FIG. 3, an engine diagnostic tool constructed in accordance with the teachings of the present invention is generally identified at reference numeral 46. It should be appreciated that engine diagnostic tool 46 operates to pressurize intake air system 14 downstream of inlet 30 to simulate turbocharger function at a relatively high engine speed. Therefore, engine diagnostic tool 46 provides a technician the opportunity of pressurizing intake air system 14 without having to run engine 12 at near peak horsepower output conditions. As such, the operator of engine diagnostic tool 46 may closely inspect and service vehicle 10 without interference from moving engine components and/or engine noise. One skilled in the art will appreciate that engine diagnostic tool 46 may be utilized to detect leaks in intake air system 14, including inspection of clamps, hoses, intercoolers and intake manifold gaskets. Furthermore, engine diagnostic tool 46 is useful in detecting wastegate leaks and improper actuation. Also, cylinder compression and cylinder ring blow-by may be investigated.

Engine diagnostic tool 46 includes a plug 48, a clamp assembly 50, an air line 52 and a pressure regulator 54. As shown in FIG. 3, diagnostic tool 46 is a simple, easily portable tool capable of supplying regulated pressurized air to inlet air system 14. In the preferred embodiment, plug 48 is sized to mate with turbocharger inlets found on model year 1994 to 2001 DaimlerChrysler 5.9 liter Cummins turbo diesels. However, it should be appreciated that engine diagnostic tool 46 may be equipped with a variety of plugs having different diameters designed to cooperate with a variety of turbocharger inlet configurations.

Plug 48 has a generally circular cylindrical body 56 with an outer surface 58, a first face 60 and a second face 62. Outer surface 58 includes a ring groove 64 for receipt of a seal 66. Plug 48 also includes a first aperture 68 extending from first face 60 to second face 62. Preferably, first aperture 68 includes an internal thread 70 to secure a quick connect fitting 72 to plug 48. Plug 48 also includes a second aperture (not shown) extending therethrough. The second aperture also includes an internal thread (not shown) to receive a pressure relief valve 76. Pressure relief valve 76 includes a poppet 78 to allow pressurized air to escape once a target pressure is met.

Typically, inlet air is pressurized an additional 10 pounds per square inch during optimum turbocharger operation. However, pressures exceeding 25 PSI may be generated. As mentioned earlier, turbocharger 18 includes a wastegate to relieve pressures greater than 27 PSI and exhaust them to atmosphere. Accordingly, it is desirable to introduce pressures ranging from 25 to 30 PSI to test proper wastegate operation. Pressures greater than 30 PSI are undesirable since they may overload components such as hoses or clamps within intake air system 14 possibly causing damage to these components. Therefore, pressure relief valve 76 is preferably constructed to exhaust pressures greater than 30 PSI to atmosphere.

Clamp assembly 50 includes a generally circular band 80 having a first end 82 and a second end 84. First end 82 includes a first station 86 to receive a portion of an adjustment mechanism 88. Second end 84 includes a second station 90 to receive another portion of adjustment mechanism 88. Adjustment mechanism 88 includes a T-bar 92, a cross-pin 94 and a nut 96. T-bar 92 includes a first cylindrical portion 98 orthogonally intersecting a second cylindrical portion 100. First cylindrical portion 98 includes a threaded segment 102 positioned on the distal end thereof. Second cylindrical portion 100 is disposed within second station 90 to couple T-bar 92 to second end 84. Similarly, cross-pin 94 is disposed within first station 86. Cross-pin 94 includes a through aperture 104 sized such that first cylindrical portion 98 may be slidably disposed therethrough. Nut 96 is threadingly engaged with threaded segment 102 to provide an operator a simple method to collapse band 80 and couple clamp assembly 52 to outer surface 36 of inlet 30.

Clamp assembly 50 also includes a set of three arms 106 integrally formed with band 80. Each of arms 106 includes a longitudinally extending portion 108 and a radially extending portion 110. Each radially extending portion 110 includes a contact face 112 to engage second face 62 of plug 48 as will be described in greater detail hereinafter.

Air line 52 includes a hose portion 114 with female quick connect fittings 116 attached at each end. Pressure regulator 54 includes an inlet 118, an outlet 120, an adjustment knob 122 and a gage 124. In operation, inlet 118 is coupled to a source of pressurized air such as a compressor. Outlet 120 is coupled to one of the quick connect fittings 116. To regulate pressure entering inlet 30, an operator simply rotates adjustment knob 122 until the desired pressure is displayed on gage 124.

Figure 4:
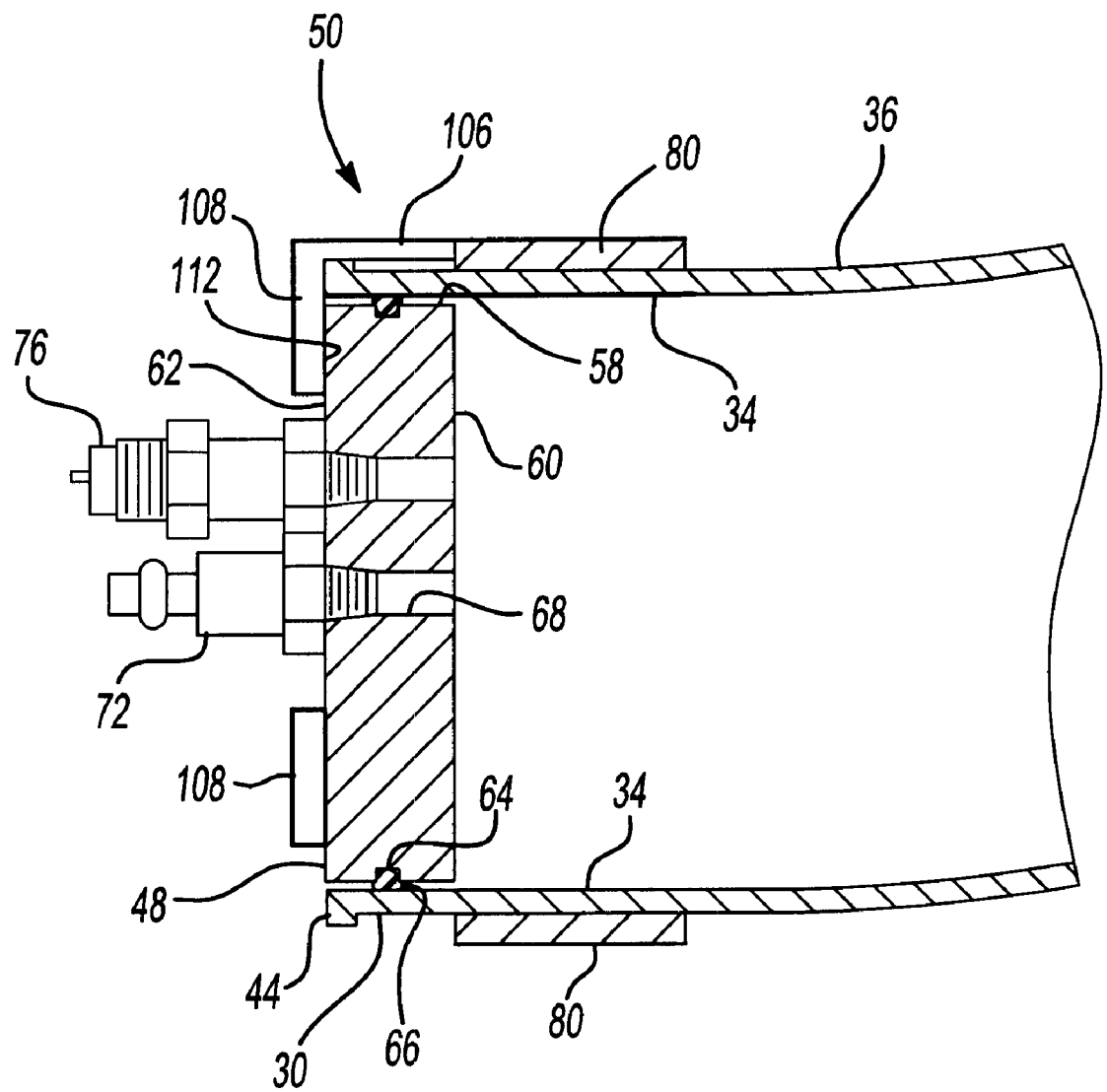
FIG. 4 is a cross-sectional view of the preferred engine diagnostic tool mounted to an exemplary turbocharger inlet.

As earlier noted, installation and operation of engine diagnostic tool 46 is accomplished by removing duct 16 from intake air system 14 and exposing impeller 22 and inlet 30 as shown in FIGS. 1 and 2. More particularly and with reference to FIG. 4, plug 48 is positioned within inlet 30. It should be appreciated that outer surface 58 defines an outer diameter slightly less in magnitude than an inner diameter defined by inner surface 34 of inlet 30. However, seal 66 protrudes from groove 64 to define an outer diameter greater than the inner diameter defined by inner surface 34. Accordingly, seal 66 is compressed by sidewall 32 to sealingly engage plug 48 with turbocharger 18.

To assure retention of plug 48 within inlet 30 during pressurization, clamp assembly 50 is removably coupled to inlet 30. Nut 96 (FIG. 3) is rotated to collapse band 80 into contact with outer surface 36 until clamp assembly 50 is firmly secured to inlet 30. Clamp assembly 50 is axially positioned along outer surface 36 to assure engagement of second face 62 with contact faces 112 prior to disengagement of seal 66 with inner surface 34. In this manner, plug 48 will be sealingly retained within inlet 30 to allow an operator to pressurize intake air system 14 without operating engine 12.

Therefore, certain operational and functional advantages have been provided by the engine diagnostic tool of the present invention. Specifically, a low cost, easily portable tool is provided to simulate turbocharger inlet air pressurization.

The foregoing discussion discloses and describes merely exemplary embodiments of the present invention. One skilled in the art will readily recognize from such discussion, and from the accompanying drawings and claims, that various changes, modifications and variations may be made therein without departing from the spirit and scope of the invention as defined in the following claims.

What is claimed:

1. A tool to facilitate operation of a turbocharger within an engine of a motor vehicle while the engine is not running, the turbocharger including an air inlet with an inner surface and an outer surface, the diagnostic tool comprising:
   a plug adapted to sealingly engage the inlet of the turbocharger, said plug including an aperture for allowing pressurized air from an air source to pass therethrough to cause operation of the turbocharger; and
   a clamp adapted to selectively restrict movement of said plug relative to the inlet, said clamp adapted to be removably coupled to the inlet.

2. The tool of claim 1 wherein said plug is adapted to be sealingly engaged with the inner surface of the inlet and wherein said clamp is adapted to be coupled to the outer surface of the inlet.

3. The tool of claim 1 further including a pressure regulator and a hose having a first end coupled to said aperture and a second end coupled to said pressure regulator.

4. The tool of claim 3 wherein said pressure regulator includes an inlet port and an outlet port, said hose being coupled to said outlet port of said pressure regulator and said inlet port being coupled to a source of pressurized air.

5. The tool of claim 1 wherein said clamp includes a band and a plurality of arms extending therefrom, each of said arms engaging said plug to restrict movement of said plug when the inlet is pressurized.

6. The tool of claim 5 wherein each of said arms includes a longitudinally extending portion and a radially extending portion, said radially extending portion including a stop face engaging said plug.

7. The tool of claim 6 wherein said band has a first end and a second end adjustably interconnected by an adjustment mechanism.

8. The tool of claim 7 wherein said adjustment mechanism includes a first member coupled to said first end and a second member coupled to said second end, said first member slidably coupled to said second member.

9. The tool of claim 8 further including a nut and wherein said first member includes a threaded portion coupled to said nut.

10. The tool of claim 1 further including a pressure relief valve coupled to said plug.

11. A method of operating a turbocharger connected to an engine without running the engine, the method comprising:

inserting a plug within an inlet of said turbocharger, said plug having an aperture therethrough and sealingly engaging said inlet;

securing a clamp to said inlet, said clamp restricting movement of said plug; and coupling a source of pressurized air to the plug to pressurize said inlet via pressurized air flowing from the source and through the aperture in the plug.

12. The method of claim 11 wherein the step of inserting a plug includes sealingly engaging said plug with an inner surface of said inlet.

13. The method of claim 12 wherein the step of securing a clamp includes engaging said clamp with an outer surface of said inlet.

14. The method of claim 11 further including the steps of coupling a first end of a hose to said plug and coupling a second end of said hose to a pressure regulator.

15. The method of claim 14 further including the step of regulating the air pressure to simulate turbocharger operation.

16. The method of claim 11 wherein said clamp includes a band and a plurality of arms extending therefrom, each of said arms engaging said plug to restrict movement of said plug when the inlet is pressurized.

17. The method of claim 16 wherein each of said arms includes a longitudinally extending portion and a radially extending portion, said radially extending portion including a stop face engaging said plug.

* * * * *